United States Patent
Ramaratnam et al.

(10) Patent No.: US 10,767,296 B2
(45) Date of Patent: *Sep. 8, 2020

(54) MULTI-DENIER HYDRAULICALLY TREATED NONWOVEN FABRICS AND METHOD OF MAKING THE SAME

(71) Applicant: FIRST QUALITY NONWOVENS, INC., Great Neck, NY (US)

(72) Inventors: Karthik Ramaratnam, Anderson, SC (US); Paul DeNoia, Anderson, SC (US); John C. Parsons, Dallas, PA (US); Peter Zajaczkowski, Greenville, SC (US)

(73) Assignee: PFNONWOVENS LLC, Hazelton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,432

(22) Filed: Jun. 12, 2018

(65) Prior Publication Data

US 2018/0291543 A1    Oct. 11, 2018

Related U.S. Application Data

(63) Continuation-in-part of application No. 15/842,644, filed on Dec. 14, 2017.
(Continued)

(51) Int. Cl.
*B32B 5/02* (2006.01)
*B32B 5/26* (2006.01)
(Continued)

(52) U.S. Cl.
CPC .................. *D06B 1/02* (2013.01); *B32B 5/26* (2013.01); *B32B 7/02* (2013.01); *D04H 3/007* (2013.01); *D04H 3/016* (2013.01); *D04H 3/11* (2013.01); *D04H 3/14* (2013.01); *D06C 29/005* (2013.01); *B32B 5/022* (2013.01); *B32B 7/022* (2019.01); *B32B 38/0012* (2013.01); *B32B 2038/0088* (2013.01); *B32B 2307/726* (2013.01); *B32B 2323/04* (2013.01); *B32B 2323/10* (2013.01);
(Continued)

(58) Field of Classification Search
None
See application file for complete search history.

(56) References Cited

U.S. PATENT DOCUMENTS 4,041,203 A * 8/1977 Brock ....................... B32B 5/08
                                              428/157
4,808,467 A * 2/1989 Suskind ................. D21H 27/34
                                              28/104
(Continued)

FOREIGN PATENT DOCUMENTS

CN        103285663 A  *  9/2013
DE        3917791 A1   * 12/1990  .......... A61F 13/5116
(Continued)

OTHER PUBLICATIONS

Machine Translation of JP-02088058-A, Mar. 1990 (Year: 1990).*

*Primary Examiner* — Jeffrey A Vonch
(74) *Attorney, Agent, or Firm* — Amster, Rothstein & Ebenstein LLP

(57) ABSTRACT

A multi-denier nonwoven composite fabric having a nested structure is hydraulically treated by particular process parameters to improve softness and tactile feel.

15 Claims, 6 Drawing Sheets

US 10,767,296 B2

Page 2

Related U.S. Application Data

(60) Provisional application No. 62/434,204, filed on Dec. 14, 2016.

(51) Int. Cl.
*D06B 1/02* (2006.01)
*D04H 3/11* (2012.01)
*D04H 3/14* (2012.01)
*D04H 3/007* (2012.01)
*D06C 29/00* (2006.01)
*D04H 3/016* (2012.01)
*B32B 7/02* (2019.01)
*B32B 38/00* (2006.01)
*B32B 7/022* (2019.01)

(52) U.S. Cl.
CPC .... B32B 2555/02 (2013.01); D10B 2321/021 (2013.01); D10B 2321/022 (2013.01); D10B 2403/022 (2013.01); D10B 2509/026 (2013.01); Y10T 442/637 (2015.04); Y10T 442/662 (2015.04); Y10T 442/663 (2015.04); Y10T 442/666 (2015.04); Y10T 442/671 (2015.04); Y10T 442/68 (2015.04); Y10T 442/681 (2015.04); Y10T 442/689 (2015.04)

(56) References Cited

U.S. PATENT DOCUMENTS

| | | | |
|---|---|---|---|
| 4,879,170 A * | 11/1989 | Radwanski | D04H 1/56 442/329 |
| 4,931,355 A * | 6/1990 | Radwanski | D04H 5/02 28/104 |
| 5,023,130 A * | 6/1991 | Simpson | D04H 1/49 442/408 |
| 5,188,885 A * | 2/1993 | Timmons | B32B 5/26 428/198 |
| 5,336,552 A * | 8/1994 | Strack | D04H 1/559 442/361 |
| 5,683,794 A * | 11/1997 | Wadsworth | B32B 5/26 442/382 |
| 5,688,468 A * | 11/1997 | Lu | D04H 3/16 264/555 |
| 5,700,254 A * | 12/1997 | McDowall | A61F 13/15617 604/378 |
| 5,766,737 A * | 6/1998 | Willey | D04H 1/559 128/849 |
| 5,810,954 A * | 9/1998 | Jacobs | D04H 3/16 156/62.4 |
| 5,885,267 A * | 3/1999 | Mishima | A61F 13/512 604/378 |
| 5,964,742 A * | 10/1999 | McCormack | D04H 1/54 604/380 |
| 6,015,605 A * | 1/2000 | Tsujiyama | A61F 13/4753 428/195.1 |
| 6,117,803 A * | 9/2000 | Morman | A61F 13/51401 442/381 |
| 6,177,370 B1 * | 1/2001 | Skoog | B32B 5/26 442/387 |
| 6,286,145 B1 * | 9/2001 | Welchel | A41D 31/02 2/69 |
| 6,352,948 B1 * | 3/2002 | Pike | B32B 5/02 442/361 |
| 6,723,669 B1 * | 4/2004 | Clark | D04H 3/16 442/329 |
| 6,759,357 B1 * | 7/2004 | Toriumi | B32B 5/26 442/375 |
| 6,781,027 B2 * | 8/2004 | Fenwick | A61F 13/5376 428/213 |
| 6,797,377 B1 * | 9/2004 | Delucia | D04H 3/00 428/372 |
| 2002/0119720 A1 * | 8/2002 | Arora | A61F 13/51466 442/327 |
| 2003/0013371 A1 * | 1/2003 | Dorsey | D01F 6/62 442/401 |
| 2003/0032355 A1 * | 2/2003 | Guckert | B31F 1/07 442/327 |
| 2003/0124927 A1 * | 7/2003 | Waldroup | A61F 13/51104 442/50 |
| 2003/0157854 A1 * | 8/2003 | Miller | D06M 15/507 442/109 |
| 2003/0173694 A1 * | 9/2003 | Wenstrup | D04H 3/14 264/13 |
| 2003/0176135 A1 * | 9/2003 | Wenstrup | D04H 3/14 442/401 |
| 2004/0048542 A1 * | 3/2004 | Thomaschefsky | D04H 1/732 442/389 |
| 2004/0077247 A1 * | 4/2004 | Schmidt | D04H 3/147 442/382 |
| 2004/0224136 A1 * | 11/2004 | Collier, IV | D04H 3/16 428/196 |
| 2005/0020170 A1 * | 1/2005 | Deka | D04H 3/02 442/327 |
| 2005/0032450 A1 * | 2/2005 | Haggard | D01D 5/36 442/327 |
| 2005/0054255 A1 * | 3/2005 | Morman | D04H 1/4374 442/381 |
| 2005/0125908 A1 * | 6/2005 | Pourdeyhimi | D06C 29/00 8/115.51 |
| 2005/0215155 A1 * | 9/2005 | Young | A61F 13/15203 442/337 |
| 2005/0244619 A1 * | 11/2005 | Kauschke | B32B 5/02 428/195.1 |
| 2006/0019570 A1 * | 1/2006 | Groten | D04H 3/009 442/401 |
| 2006/0057921 A1 * | 3/2006 | Turi | D04H 3/14 442/327 |
| 2007/0090555 A1 * | 4/2007 | Roettger | D01D 5/0985 264/103 |
| 2007/0173162 A1 * | 7/2007 | Ethiopia | D04H 3/16 442/327 |
| 2007/0219518 A1 * | 9/2007 | Rosenfeld | A61F 13/15203 604/368 |
| 2008/0038982 A1 * | 2/2008 | Motomura | B32B 5/26 442/382 |
| 2008/0146110 A1 * | 6/2008 | Patel | D04H 3/007 442/334 |
| 2008/0268194 A1 * | 10/2008 | Kim | D04H 3/14 428/43 |
| 2009/0111347 A1 * | 4/2009 | Peng | D01F 1/10 442/334 |
| 2009/0233073 A1 * | 9/2009 | Bornemann | B32B 5/26 428/220 |
| 2010/0130086 A1 * | 5/2010 | Dorsey | D04H 1/495 442/402 |
| 2010/0324515 A1 * | 12/2010 | Boscolo | D04H 5/06 604/367 |
| 2011/0217894 A1 * | 9/2011 | Coslett | D04H 1/56 442/382 |
| 2012/0046400 A1 * | 2/2012 | Kaarto | C08L 23/10 524/210 |
| 2013/0237111 A1 * | 9/2013 | Crown | C08L 23/142 442/268 |
| 2014/0038482 A1 * | 2/2014 | Lu | D06M 13/224 442/60 |
| 2014/0072767 A1 * | 3/2014 | Klaska | D04H 1/544 428/156 |
| 2014/0088535 A1 * | 3/2014 | Xu | D04H 3/14 604/366 |
| 2014/0127459 A1 * | 5/2014 | Xu | D04H 1/4374 428/141 |
| 2014/0127460 A1 * | 5/2014 | Xu | A61F 13/51478 428/141 |
| 2014/0127461 A1 * | 5/2014 | Xu | A61F 13/8405 428/141 |
| 2014/0155854 A1 * | 6/2014 | MacDonald | D04H 3/14 604/372 |
| 2014/0248811 A1 * | 9/2014 | Degroot | D01F 8/06 442/170 |

(56) References Cited

U.S. PATENT DOCUMENTS

| | | | | |
|---|---|---|---|---|
| 2016/0251788 A1* | 9/2016 | Huang | ................. | D04H 1/4291 |
| | | | | 442/382 |
| 2017/0137980 A1* | 5/2017 | Kauschke | .............. | D04H 1/495 |
| 2018/0178486 A1* | 6/2018 | Mecl | ....................... | D04H 3/016 |
| 2020/0016013 A1* | 1/2020 | Mecl | ......................... | B32B 5/24 |

FOREIGN PATENT DOCUMENTS

| | | | | |
|---|---|---|---|---|
| DE | 19945548 C1 * | 1/2001 | ......... | A61F 13/5123 |
| GB | 2272859 A * | 6/1994 | ........ | A61F 13/51311 |
| JP | 02088058 A * | 3/1990 | | |
| JP | 04061857 A * | 2/1992 | | |
| JP | 09111635 A * | 4/1997 | ............... | D04H 3/14 |
| JP | 2013133579 A * | 7/2013 | | |
| KR | 20030057787 A * | 7/2003 | .......... | D04H 1/4374 |
| WO | WO-9932699 A1 * | 7/1999 | ............... | D04H 3/14 |
| WO | WO-0045762 A1 * | 8/2000 | ....... | A61F 13/51401 |
| WO | WO-0109425 A1 * | 2/2001 | ........... | D04H 1/4374 |
| WO | WO-2014115401 A1 * | 7/2014 | ............... | D04H 3/14 |
| WO | WO-2015178423 A1 * | 11/2015 | ........... | A61F 13/514 |

\* cited by examiner

| EXAMPLE | 1 | 2 | 3 | 4 | 5 | 6 | 7 |
|---|---|---|---|---|---|---|---|
| BASIS WEIGHT, gsm | 22.63 | 22.375 | 22.985 | 25.7 | 25.4 | 21.93 | 21.11 |
| THICKNESS, mm | 0.155 | 0.155 | 0.158 | 0.292 | 0.256 | 0.142 | 0.148 |
| MD HOM, g | 4.45 | 4.96 | 5.6 | 9.3 | 9.2 | 4.97 | 4.34 |
| CD HOM, g | 1.35 | 1.67 | 1.44 | 6.3 | 5.9 | 1.00 | 1.31 |
| Average HOM, G | 2.9 | 3.3 | 3.5 | 7.8 | 7.5 | 2.99 | 2.83 |
| COF Static | 0.638 | 0.722 | 0.518 | | | 0.780 | 0.817 |
| COF Kinetic | 0.405 | 0.472 | 0.337 | 0.17 | 0.19 | 0.502 | 0.544 |
| ABRASION | 5 | 5 | 5 | | | 5 | 5 |
| AIR PERM, m³/m²/min | 133.8 | 129.0 | 123.3 | 150.5 | 147.5 | 131.7 | 176.8 |
| OPACITY % | 29.89 | 30.79 | 33.07 | 43.7 | 38.6 | 38.2 | 36.4 |
| MD TENSILE AVG g/cm | 915.15 | 937.909 | 1074.827 | | | | |
| MD TENSILE AVG, N/cm (WSP) gsm | 8.97 | 9.20 | 10.54 | 8.7 | 9.9 | 10.10 | 8.32 |
| MD ELONG AVG % | 33.88 | 31.69 | 36.61 | | | 28.5 | 34.95 |
| CD TENSILE AVG g/cm | 390.13 | 379.998 | 462.867 | | | | |
| CD TENSILE AVG, N/cm (WSP) g/cm | 3.83 | 3.73 | 4.54 | 5.2 | 6.2 | 3.98 | 3.05 |
| CD ELONG AVG % | 50.75 | 46.8 | 52.91 | | | 56.8 | 61.6 |

FIG. 3

MULTI-DENIER HYDRAULICALLY TREATED NONWOVEN FABRICS AND METHOD OF MAKING THE SAME

RELATED APPLICATIONS

This application claims priority as a continuation-in-part to U.S. Non-Provisional patent application Ser. No. 15/842,644, filed Dec. 14, 2017 and entitled HYDRAULICALLY TREATED NONWOVEN FABRICS AND METHOD OF MAKING THE SAME, which in turn claims priority to U.S. Provisional Patent Application Ser. No. 62/434,204, filed Dec. 14, 2016 entitled HYDRAULICALLY TREATED NONWOVEN FABRICS AND METHOD OF MAKING THE SAME, the contents of which are incorporated herein by reference in their entirety.

FIELD OF THE INVENTION

The present invention relates to hydraulically treated nonwovens and in particular relates to methods of manufacturing hydraulically treated nonwovens.

BACKGROUND OF THE INVENTION

Continued improvements in hydraulically treated nonwoven fabrics is of interest in personal care products (e.g. baby diapers, feminine care, adult products) both for functional and perceptual reasons. In particular, abrasion resistance and softness are properties that are of interest. However, improvements that provide abrasion resistance generally decrease softness and improvements that improve softness generally decrease abrasion resistance. Accordingly, a nonwoven fabric that combines both enhanced abrasion resistance and softness is desired.

SUMMARY OF THE INVENTION

The present invention is directed to an improved hydraulically treated nonwoven fabric. The hydraulically treated nonwoven fabrics may be used, for example, with disposable absorbent articles, such as disposable diapers, incontinence and feminine care products, and disposable products for the medical and other industries.

In an exemplary embodiment, a nonwoven composite fabric includes at least a first nonwoven web made from substantially continuous fibers having a first denier; and a second nonwoven web made from substantially continuous fibers having a second denier that is less than the first denier, and thermally bonded to the first nonwoven web, the nonwoven composite fabric being hydraulically treated, wherein the nonwoven composite fabric has a high degree of abrasion resistance and softness.

In an exemplary embodiment, the nonwoven composite fabric includes a third nonwoven web made from substantially continuous fibers having a third denier that is greater than the second denier.

In an exemplary embodiment, the second nonwoven web is located between the first and third nonwoven webs.

In an exemplary embodiment, the substantially continuous fibers of the first nonwoven web are spunbond fibers.

In an exemplary embodiment the substantially continuous fibers of the second nonwoven web are spunbond fibers.

In an exemplary embodiment, the substantially continuous fibers of the third nonwoven web are spunbond fibers.

In at least one embodiment, the substantially continuous fibers of the second nonwoven web are meltblown fibers that are substantially comprised of a polymer resin with a melt flow rate of less than 1800 g/10 min. In other embodiments the melt flow rate is less than 1200 g/10 min.

In an exemplary embodiment, the nonwoven composite fabric further comprises a regular bond pattern having a percentage bond area of 8% or greater.

In at least one embodiment, the nonwoven composite fabric is hydroengorged.

In an exemplary embodiment, a process of manufacturing a nonwoven fabric comprises bonding one or more webs comprised of spunbond fibers having a first denier to an additional web comprised of spunbond fibers having a second denier, said bonding comprising a regular bond pattern having a percentage bond area of 8% or greater; and hydraulically treating the bonded webs by a plurality of steps of water injection, said plurality of water injection steps comprising: a first water injection step of exposing said bonded webs to a plurality of water jets at a first pressure within a range of about 180-250 bars; a second water injection step of exposing said bonded webs to a plurality of water jets at a second pressure within a range of about 180-250 bars; and a third water injection step of exposing said bonded webs to a plurality of water jets at a third pressure within a range of about 180-250 bars, and wherein said second denier is at most 75% of said first denier.

In an exemplary embodiment, a process of manufacturing a nonwoven fabric comprises bonding one or more webs comprised of spunbond fibers having a first denier to an additional web comprised of spunbond fibers having a second denier, said bonding comprising a first bond pattern having a percentage bond area of 8% or greater; and hydraulically treating the bonded webs by a plurality of steps of water injection, said plurality of water injection steps comprising: a first water injection step of exposing said bonded webs to a plurality of water jets at a first pressure within a range of about 50-250 bars; a second water injection step of exposing said bonded webs to a plurality of water jets at a second pressure within a range of about 50-250 bars; and a third water injection step of exposing said bonded webs to a plurality of water jets at a third pressure within a range of about 50-250 bars, and wherein said second denier is at most 75% of said first denier.

In an exemplary embodiment, the process of manufacturing a nonwoven fabric further comprises bonding being performed by calendering.

In at least one embodiment, a first bond pattern is anisotropic.

In at least one embodiment, the first polymer component is polypropylene.

In at least one embodiment, the first polymer component is polylactic acid (PLA).

In at least one embodiment, the first polymer component is viscose.

In at least one embodiment, the continuous fibers of the first layer include a second polymer component.

In at least one embodiment, the second polymer component is polyethylene.

In at least one embodiment, the continuous fibers of the first layer are bicomponent fibers.

In at least one embodiment, the nonwoven web has a basis weight within the range of 5 gsm to 60 gsm.

In at least one embodiment, the nonwoven composite fabric further comprises a third layer that comprises a nonwoven web comprising substantially continuous fibers including a first polymer component.

According to an exemplary embodiment of the present invention, a method of making a nonwoven web comprises:

forming a first nonwoven web comprising substantially continuous spunbond fibers; forming a second nonwoven web comprising substantially continuous fibers of a lower denier than that of the spunbond fibers of the first nonwoven web; bonding the first and second nonwoven webs to form respective first and second layers; and hydraulically treating the bonded nonwoven webs.

In at least one embodiment, the step of forming a first nonwoven web comprises a spunmelt process.

In at least one embodiment, the substantially continuous fibers of the second nonwoven web are spunbond fibers.

In at least one embodiment, the substantially continuous fibers of the second nonwoven web are meltblown fibers that are substantially comprised of a polymer resin with a melt flow rate of less than 1800 g/10 min. In other embodiments the melt flow rate is less than 1200 g/10 min.

According to an exemplary embodiment of the present invention, a method of making an nonwoven composite fabric comprises: forming a first nonwoven web comprising continuous spunbond fibers; forming a second nonwoven web comprising continuous meltblown fibers; forming a third nonwoven web comprising continuous spunbond fibers; calender bonding the first, second and third nonwoven webs at a pressure of between 30 Newtons per meter (N/m) and 90 N/m to form a composite fabric, said bonding comprising a regular bond pattern; and hydraulically treating the nonwoven composite fabric. As used herein, "continuous" refers to fibers that are generally continuous (as opposed to having a fixed length), but which may include some breaks and free ends.

In at least one embodiment, the step of hydraulically treating the bonded webs comprises a plurality of water injection steps, said plurality of water injection steps comprising: a first water injection step of exposing said bonded webs to a plurality of water jets at a first pressure within a range of about 50-250 bars; a second water injection step of exposing said bonded webs to a plurality of water jets at a second pressure within a range of about 50-250 bars; and a third water injection step of exposing said bonded webs to a plurality of water jets at a third pressure within a range of about 50-250 bars.

In at least one embodiment, the composite fabric comprises about 5% meltblown fibers by weight and the meltblown fibers are substantially comprised of a polymer resin with a melt flow rate of less than 1800 g/10 min. In other embodiments the melt flow rate is less than 1200 g/10 min.

In an exemplary embodiment, a nonwoven composite fabric comprises first and second outer nonwoven layer comprising spunbond fibers, and a third inner nonwoven layer comprising meltblown fibers, wherein the nonwoven composite fabric is thermally bonded with a regular bond pattern having a percentage bond area of 8% or greater.

In an exemplary embodiment, a nonwoven composite fabric comprises first and second outer nonwoven layer comprising spunbond fibers; and a third inner nonwoven layer comprising meltblown fibers, wherein the nonwoven composite fabric is thermally bonded with a regular bond pattern having a percentage bond area of 8% or greater, the nonwoven composite fabric is hydraulically treated, the basis weight of the third inner layer is at least 5 grams per square meter (gsm); and the nonwoven composite fabric has an abrasion rating of 4.0 or higher and an average Handle-O-Meter measurement (HOM) of 6.0 grams (g) or lower.

In at least one embodiment, the basis weight of the third inner layer is at least 10 grams per square meter.

In at least one embodiment, the spunbond fibers of the first and second outer nonwoven layers comprise polypropylene and at least 5% by weight of a propylene based elastomer; and wherein the nonwoven composite fabric has an average Handle-O-Meter measurement (HOM) of 6.0 grams (g) or lower.

In at least one embodiment, the fibers of at least one of the nonwoven layers comprises a slip agent.

Other features and advantages of the present invention will become readily apparent from the following detailed description and the accompanying drawings.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein:

FIG. 3 is a table of results for hydraulically-treated nonwovens formed under process parameters and conditions, along with ratings of the nonwoven fabrics, in accordance with exemplary embodiments of the present invention;

DETAILED DESCRIPTION

Figure 1:
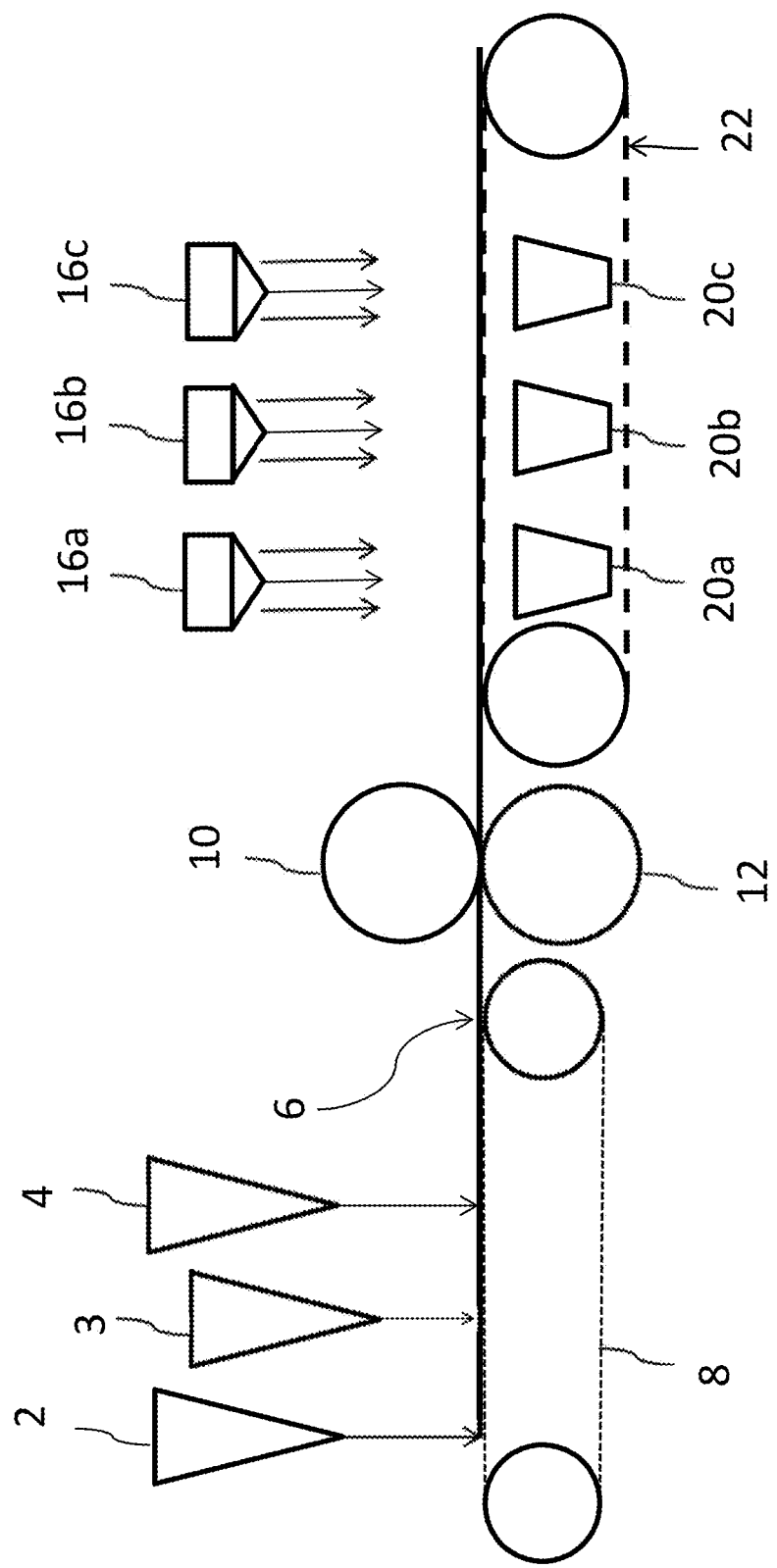
FIG. 1 is a representative diagram of a system for hydraulically treating nonwoven fabrics according to a first exemplary embodiment of the present invention.

The present invention is directed to hydraulically treated nonwoven fabrics having improved softness and abrasion resistance and methods for making the same.

A nonwoven web hydraulically treated in accordance with the present invention is especially suitable for use in disposable absorbent articles. As used herein, the term "absorbent article" refers to articles which absorb and contain fluids and solid materials. For example, absorbent articles may be placed against or in proximity to the body to absorb and contain the various exudates discharged by the body. Absorbent articles may be articles that are worn, such as baby diapers, adult incontinence products, and feminine care products, or hygienic products that are used to absorb fluids and solid materials, such as for the medical profession which uses products like disposable gowns and chucks. In particular, the nonwovens may be used as or as part of a body contacting layer such as a topsheet. The nonwovens may also be used for packaging or wrapping items such as absorbent articles. The term "disposable" is used herein to describe absorbent articles which are not intended to be laundered or otherwise restored or reused as an absorbent article, but instead are intended to be discarded after a single use and, preferably, to be recycled, composted or otherwise disposed of in an environmentally compatible manner.

The terms "nonwoven fabric, sheet, layer or web" as used herein means a structure of individual fibers, filaments, or threads that are positioned in a substantially random manner to form a planar material, as opposed to a knitted or woven fabric. Examples of nonwoven fabrics include meltblown webs, spunbond webs, carded webs, air-laid webs, wet-laid webs, and spunlaced webs. A nonwoven composite fabric comprises more than one nonwoven layer.

The term "spunbond fibers" as used herein means substantially continuous fibers or filaments having an average diameter in the range of 10-30 microns. Splittable bicomponent or multicomponent fibers having an average diameter in the range of 10-30 microns prior to splitting are also included.

The term "meltblown fibers" as used herein, means substantially continuous fibers or filaments having an average diameter of less than 10 microns.

An exemplary embodiment of the present invention may include changing the MB and/or SB fiber diameter to further improve the tactile feel of the material without detracting from abrasion performance.

An exemplary embodiment of the present invention includes a multi-layer composite fabric comprising at least one first layer of fibers (preferably spunbond) bonded to at least one second layer of fibers (preferably spunbond) where the denier of the second layer of fibers is at least 1.3 times less than the median fiber diameter of the first layer. An exemplary nonwoven fabric can be formed in-line by sequentially depositing one or more layers of spunbond fibers followed by one or more layers of lower denier spunbond fibers on a moving collecting surface. The assembled layers can be thermally bonded by passing them through a calender nip formed between two calender rolls. Each calender roll may be heated or it may be unheated. Each calender roll may have a pattern or it may be smooth. Alternatively, the layers may be bonded ultrasonically, adhesively or through air bonding. In an alternative embodiment, the individual layers can be pre-formed and optionally bonded and collected individually such as by winding the fabrics on wind-up rolls. The individual layers can then be assembled by layering at a later time and bonded together to form a composite fabric.

In embodiments, the spunbond fibers with the larger denier, in the first layer of fibers, may be in the standard denier range of 1.5 to 3 denier. The lower denier spunbond fibers, in the second layer of fibers, may have a denier in the range of 0.5 to 1.5 denier. In embodiments, there may be two or more webs of lower denier spunbond fibers wherein the denier of the fibers differs between the two or more webs. For example, in addition to a web of standard denier spunbond, there may be a web of lower denier spunbond fibers with a denier in the range of 1.0 to 1.5 denier and a web of lower denier spunbond fibers with a denier in the range of 0.5 to 1.0 denier. In embodiments the ratio of the denier of the fibers of the two webs may be at least 1:1.3 and preferably at least 1:1.5. In embodiments, the denier may differ by at least 0.5 denier.

In embodiments, the base fabric may be an "SsS" (the lower case "s" referring to a low denier spunbond web) structure that may be produced with multiple spunbond beams wherein the fabric has outer standard denier spunbond layers and an inner low denier spunbond layer. According to an embodiment of the invention, the base fabric is thermally pattern bonded prior to being hydraulically treated.

Without being bound by theory, it is believed that the thermal bonding keeps the fibers relatively fixed in place and thus restricts movement of the fibers caused by the water jets during the hydraulic treatment. In a standard SMS fabric this in turn causes the meltblown fibers to break or deform while the integrity of the spunbond layers and the thermal bonds stay relatively intact. The broken or deformed meltblown fibers are entangled with the spunbond fibers, however because the thermal bonds are kept intact, the meltblown fibers are still thermally bonded to the base fabric. In this manner, the meltblown fibers provide an increased softness to the fabric. However, a side effect of using meltblown fibers is that some of the fibers may be washed out during the treatment process, thus requiring an additional reclamation step. Further, when entangled, the meltblown fibers can tend towards clumping, reducing the uniformity of the fabric and in turn requiring a greater quantity of meltblown fibers to achieve the desired result.

Without being bound by theory, it is also believed that entanglement of one web of spunbond fibers with the a second web of spunbond fibers having a reduced denier results in increased coiling of the spunbond fibers without significant degradation of the spunbond layers. It is also believed that the coiling or looping behavior of the spunbond fibers increases the loft of the material. Further, the lower denier spunbond fibers are believed to have a greater degree of Z directional movement, with this movement including passing through the first web of spunbond fibers and wrapping and twisting around the higher denier fibers. It is thus believed that the lower denier spunbond fibers can, in part, migrate to the surface of a nonwoven fabric, thus providing improved softness while the higher denier fiber first web provides integrity and strength.

In particular, a hydraulic treatment step may be used to provide increased loft to the nonwoven fabric. The hydraulic treatment used to increase loft in this manner, as opposed to increasing entanglement, is known as hydroengorgement. The term "hydroengorgement" as used herein refers to a process by which hydraulic energy is applied to a nonwoven fabric such that there is a resultant increase in caliper as well as in softness, both relative to the nonwoven fabric prior to hydroengorgement. Preferably there is an increase of at least 50% in caliper. The hydroengorgement process is described in detail in U.S. Pat. No. 7,858,544, the contents of which are incorporated herein by reference in their entirety.

In an embodiment of the invention, a first web of higher denier spunbond fibers is bonded with a second web of relatively lower denier spunbond fiber. A subsequent hydroengorgement treatment of this composite fabric may result in the formation of tufts of lower denier spunbond fibers that are substantially intact and further provide an improved softness and hand feel to the composite fabric without substantially reducing the strength and integrity of the fabric. While the lower denier fibers are initially located behind the first web of higher denier fibers, the hydroengorgement process urges some of the fibers into the first web and potentially through to the surface of the first web.

An embodiment of the process invention is shown in FIG. 1. First, spunbond beam 2, low denier spunbond beam 3 and spunbond beam 4 are used to form a nonwoven web (hereinafter also referred to as "fabric" or "base fabric") 6 on conveyor belt 8. The web 6 is then bonded with calender rolls 10 and 12. According to further exemplary embodiments of the invention, plural elements corresponding to each of beams 2, 3, 4 may be incorporated in the system to form multiple respective layers of web 6—for example, depositing multiple spunbond layers to form an SsssS or SssssS fabric. According to an exemplary embodiment of the invention, lower denier spunbond fibers may comprise between 2% and 55% of the total weight of the web 6. Alternatively, the fabric may include one or more meltblown layers in addition to the high and low denier spunbond layers.

According to an exemplary embodiment of the invention, a spunmelt nonwoven web is made of continuous filaments that are laid down on a moving conveyor belt 8 in a randomized distribution. Resin pellets may be processed under heat into a melt and then fed through a spinneret (or spinning beams 2 and 4) to create hundreds of filaments by use of a drawing device (not shown). As described before, multiple spinnerets or beams (blocks in tandem) may be used to provide an increased density of spunbond fibers corresponding to, for example, each of spinning beams 2 and 4. Jets of a fluid (such as air) cause the fibers from beams 2 and 4 to be elongated, and the fibers are then blown or carried onto a moving web (conveyor belt) 8 where they are laid down and sucked against the web 8 by suction boxes (not shown) in a random pattern to create a fabric structure 6.

Modifying the denier of the spunbond fibers can be achieved by spinning the fibers at an increased rate. The denier of the spunbond fibers can also be reduced through the use of a high melt flow ("MFR") rate resin, such as polypropylene resins typically used for making meltblown nonwovens. Additional additives may include slip agents, opacifiying agents and softness enhancing agents.

Alternatively, a meltblown layer may be deposited by a meltblown mechanism (or "beam") 3 between spunbond layers laid by spinning beams 2 and 4. The meltblown ("MB") layer can be meltblown, but may be formed by a variety of other known processes. For example, the meltblowing process includes inserting a thermoplastic polymer into a die. The thermoplastic polymer material is extruded through a plurality of fine capillaries in the die to form fibers. The fibers stream into a high velocity gas (e.g. air) stream which attenuates the streams of molten thermoplastic polymer material to reduce their diameter, which may be to the microfiber diameter. The meltblown fibers are quasi-randomly deposited by beam 3 over the spunbond layer laid by spinning beam 2 to form a meltblown web. Multiple capillaries are placed side by side in a block to generate sufficient fibers across the total width of the nonwoven fabric 6, and two or more blocks may be used in tandem in order to increase the coverage of fibers. The meltblown fibers can be tacky when they are deposited, which generally results in some bonding between the meltblown fibers of the web. In an embodiment, a relatively low MFR resin may be used in order to form meltblown fibers that are thicker and more resilient than standard meltblown fibers. Exemplary low MFR resins may have a MFR in the range of 200-1800 g/10 min and preferably in the range of 200-1200 g/10 min. Without being bound by theory, it is believed that such low MFR meltblown fibers have increased denier and strength that results in reduced breakage and behavior similar to low denier spunbond fibers when hydraulically treated.

In a preferred embodiment, the fibers used to form web 6 are thermoplastic polymers, examples of which include polyolefins, polyesters (e.g., polylactic acid or "PLA"), polyamides, copolymers thereof (with olefins, esters, amides or other monomers) and blends thereof. As used herein, the term "blend" includes either a homogeneous mixture of at least two polymers or a non-homogeneous mixture of at least two physically distinct polymers such as bicomponent fibers. Preferably the fibers are made from polyolefins, examples of which include polyethylene, polypropylene, propylene-butylene copolymers thereof and blends thereof, including, for example, ethylene/propylene copolymers and polyethylene/polypropylene blends. According to an exemplary embodiment of the invention, the base fabric may also comprise staple fibers and/or pulp fibers.

In an exemplary embodiment, web 6 may be thermally calender bonded via rollers 10 and 12. In addition, a degree of bonding may be imparted by the meltblown fibers (from beam 3) as a result of low pressure calendering or during the initial web formation due to the meltblown fibers staying at a sufficiently high temperature to adhere to the spunbond fibers of beams 2 and 4. One or both of the rollers 10 and 12 may have their circumferential surfaces machined, etched, engraved or otherwise formed to have thereon a pattern of protrusions and recessed areas, so that bonding pressure exerted on the web 6 at the nip is concentrated at the outward surfaces of the protrusions, and reduced or substantially eliminated at the recessed areas. According to an exemplary embodiment of the invention, the roller 10 is a calender roll and the roller 12 is a bonding roll defining a bond pattern. In accordance with an exemplary embodiment of the invention, the bond pattern defined by the bonding roll may have a percentage bond area of 10% or greater. Commonly owned U.S. Pat. Nos. 6,537,644, 6,610,390, and 6,872,274, each of which is incorporated herein by reference, disclose nonwovens having a non-symmetrical pattern of fusion bonds (that is, an anisotropic or asymmetrical pattern). The bonds may be closed figures elongated in one direction and selected from the group consisting of closed figures (a) oriented in parallel along the one direction axis, (b) oriented transverse to adjacent closed figures along the one direction axis, and (c) oriented sets with proximate closed figures so as to form there between a closed configuration elongated along the one direction axis. Alternatively, the web 6 may be ultrasonically bonded or through-air bonded. The degree of bonding used may vary depending on the type of hydraulic treatment that is used. In an exemplary embodiment, a well-bonded SsS or SMS web 6 may be subjected to a hydraulic treatment that results in hydroengorgement of the spunbond layers with the fibers of the meltblown layer being entangled with the spunbond fibers. For an exemplary SsS or SMS web made primarily from polypropylene fibers, a "well bonded" pattern could be obtained by using a bond pressure of about 90 N/m and a temperature of about 150° C. Without being bound by theory, it is believed that the increased degree of bonding results in more uniform spunbond layers and thus improves the appearance of web 6.

In accordance with an embodiment of the invention, web 6 is then hydraulically treated using multiple water jet injectors 16a, 16b, and 16c—each of elements 16a, 16b, and 16c illustrated in FIG. 1 may represent a set of plural injectors in a respective predetermined arrangement. According to an exemplary embodiment of the invention, as web 6 is conveyed under the injectors 16a-c by a conveyor 22, high pressure water jets act against and pass through the fabric. Corresponding water sinks, or vacuums and the like, 20a, 20b, and 20c may be positioned under the location of each injector (set) 16a-c to pull the water away and dry the fabric 6. Nonwoven web 6 may subsequently be dried by blowing hot air through the fibrous web, by IR dryers or other drying techniques (e.g., air drying).

Figure 2:
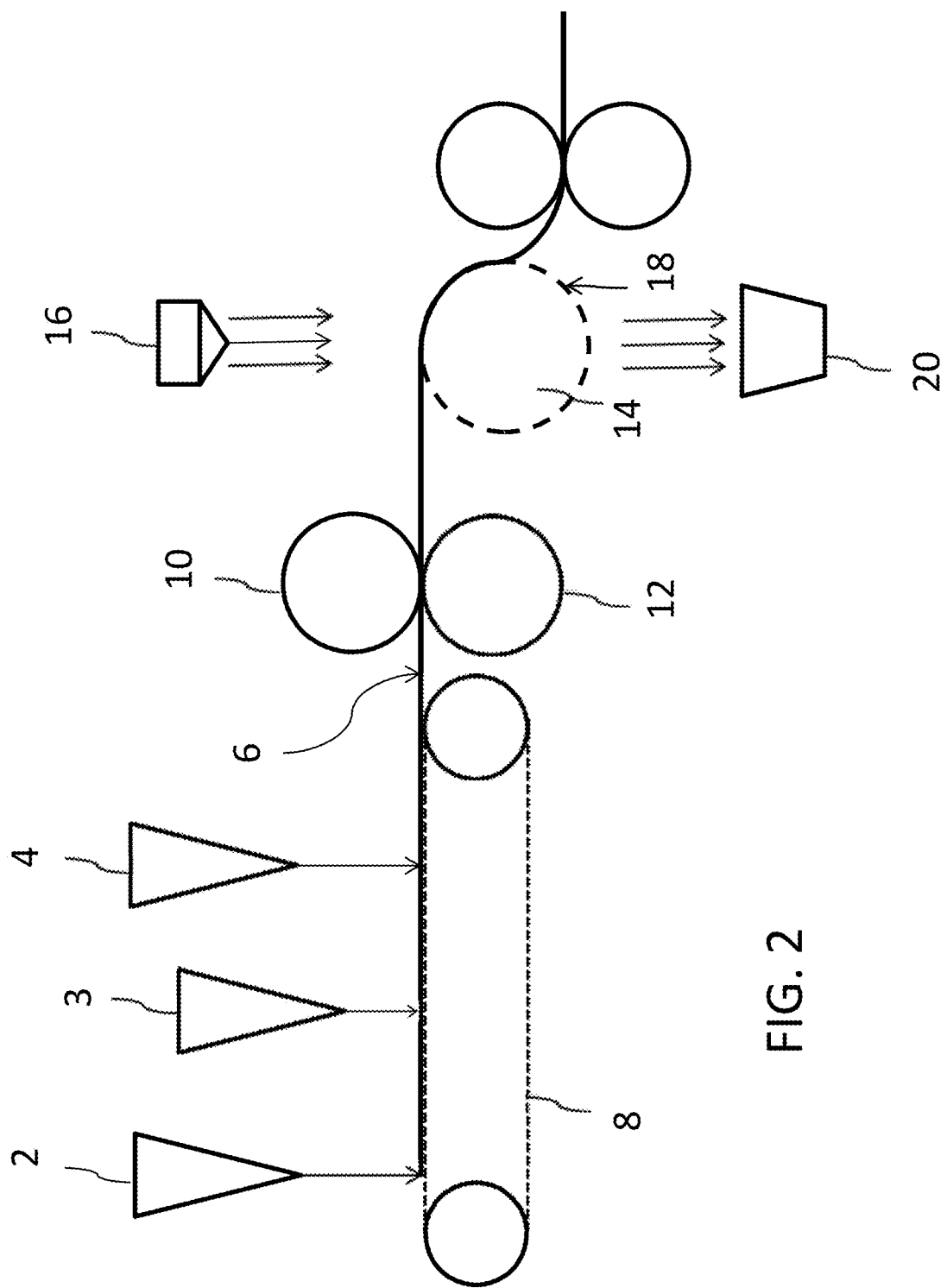
FIG. 2 is a representative diagram of a system for hydraulically treating nonwoven fabrics according to a second exemplary embodiment of the present invention.

According to an exemplary embodiment of the invention, conveyor 22 may incorporate one or more screens each with a predetermined pattern for supporting fabric/web 6 while it is being hydraulically treated by respective water injectors 16a-16c—for example, as shown in FIG. 2, by employing one or more drums 14 with corresponding sleeves 18 that act as the one or more screens. According to embodiments of the invention, fewer than three sets of injectors 16a-16c may be used for hydraulically treating fabric/web 6. As detailed further below with reference to FIGS. 3 and 4, water injectors 16a-16c may be set to respective water pressures.

In accordance with an exemplary embodiment of the invention, pressure of about 80-200 bars may be employed for hydraulic treatment.

In embodiments, the base fabric 6 is pre-heated above around 100° F. before feeding into the hydraulic treatment unit, which may comprise, among other elements, conveyor 22 (and/or drum 14), water injectors 16, and water collectors 20. Pre-heating of the web 6 could be done using a thermal calendaring unit (such as rollers 10 and 12), infrared unit, hot-air blower, or combinations thereof. Additionally, the water used in the hydraulic treatment unit—i.e., water from injectors 16—could be heated. Pre-heating of the web 6 allows the meltblown fibers to be more flexible, leading to improved characteristics and better pattern definition at lower water jet pressures and limiting fiber breakage.

In embodiments, either or both spunbond and meltblown layers have one or more in-melt hydrophilic additives added to any/all of the individual web layers. This added hydrophilicity to the base polymer web enables the individual PP filaments to absorb some amount of water during the pre-entangling stages of the hydroentangling process. Without being bound by theory, increase in water absorption allows greater flexibility leading to better pattern definition at lower water jet pressures and minimal fiber breakage.

In an exemplary embodiment, the spunbond fibers include additives to improve softness. Examples of such additives include random copolymers (e.g., Total™ 7860 (Total SA), Moplen® RP348SK (Reg. No. 0711971, from LyondellBasell under license to PolyMirae), and the like); slip additives (e.g., PolyVel® S-1519, S-2446 (Reg. No. 1423496, from PolyVel, Inc.)); and other soft additives (e.g., Techmer® PPM11790 (Reg. No. 3001764, from Techmer PM, LLC), Accurel® GA 300 (Reg. No. 1141925, from Armak Co.), or FW505, FW515 (from Keimei Plastifizierung Technik (Yantai) Co., Ltd.)). Additives, such as those described above and the like, may also be added to the MB fibers in order to modify surface feel and physical performance e.g. absorption rate. In an exemplary embodiment, a base fabric with an SMS structure includes an amount of meltblown fibers making up 2 to 30% of total web weight, more preferably 3-15% of the total web weight and most preferably about 5% of the total web weight.

In an exemplary embodiment of the invention, a second calendering step—using, for example, rollers similar to rollers 10 and 12—may be employed to provide additional thermal bonding to web 6. Such a step may be performed with sealing heat treatment at 130 to 150° C. and a pressure range of 30-90 N/mm. Topical treatment may also be used to minimize loose fiber ends. Alternatively, air through bonding may be used to provide additional thermal bonding.

In an exemplary embodiment, the nonwoven web resulting from the above-described process may have a Bond Area Percentage greater than 10%, preferably greater than 15%, more preferably in the range of 16%-22%, and more preferably in the range of 18%-20%. The "Bond Area Percentage" on a nonwoven web is a ratio of area occupied by bond impressions, to the total surface area of the web, expressed as a percentage. The method for measuring Bond Area Percentage is described in U.S. Pat. No. 8,841,507, the contents of which are incorporated herein by reference in their entirety.

The nonwoven web 6 may be incorporated into a nonwoven composite fabric. The nonwoven composite fabric may include additional layers of continuous fibers such as spunbond fibers and meltblown fibers and may include composite nonwovens such as spunbond-meltblown-spunbond composite fabrics. The nonwoven composite fabric may also include short fibers such as staple fibers or may include pulp fibers. These short fibers may be in the form of a consolidated web such as carded web or tissue sheet or may be initially unconsolidated. The nonwoven composite fabric may also include superabsorbent material, either in particulate form or in a fiberized form. The composite fabric may be formed through conventional means, including but not limited to thermal bonding, ultrasonic bonding, chemical bonding, adhesive bonding and/or hydroentanglement. In accordance with an embodiment of the invention, web 6 may form a nonwoven composite fabric resulting from the one or more processes described above for use as a topsheet, an absorbent core, or a backsheet of an absorbent article.

The nonwoven web 6 may be used in applications where a soft, skin-facing surface is desired. Such applications include topsheets for absorbent articles and inner layers for medical gowns. In applications where fluid impermeability is desired, such as medical fabrics, the nonwoven web 6 may be used in a composite with a fluid impermeable nonwoven such as SMS or may be used in a composite with a film.

EXAMPLES

Examples of hydraulically treated nonwovens made in accordance with exemplary embodiments are described below and measured characteristics of those examples are provided in the table of FIG. 3.

Example 1

The nonwoven fabric of Example 1 was produced by calendering 4 layers of spunbond and then hydroengorging the laminate followed by drying and winding. Each spunbond layer was made up of approximately 77% CP 360H Braskem polypropylene resin, 20% Vistamaxx 7020-BF from Exxon-Mobil and 3% polypropylene masterbatch resin from Standridge Color Corporation containing 10% $TiO_2$ and 10% Erucamide slip aid by weight respectively. During spinning of each spunbond layer, the filaments were spun at a throughput of about 112 kg/hr/m and exposed to cabin pressures in the range of about 4000 Pascals. These layers were calendered with an engraved roll temperature of 165° C., smooth roll temperature of 167° C. and a pressure between the engraved and smooth roll in the range of 67 N/mm. This calendered web was subsequently hydrogorged in 2 steps with each step comprised of a HE drum and 2 injectors. The calendered fabric was exposed to HE pressure ranges of 140 bars of water pressure per injector station followed by drying the fabric using a through air dryer at about 125° C.

Example 2

The nonwoven fabric of Example 2 was produced by calendering 4 layers of spunbond and then hydroengorging the laminate followed by drying and winding. Each spunbond layer was made up of approximately 77% CP 360H Braskem polypropylene resin, 5% 3962 Meltblown PP resin from Total Petrochemicals, 15% Vistamaxx 7020-BF from Exxon-Mobil and 3% polypropylene masterbatch resin from Standridge Color Corporation containing 10% $TiO_2$ and 10% Erucamide slip aid by weight respectively. During spinning of each spunbond layer, the filaments were spun at a throughput of about 112 kg/hr/m and exposed to cabin pressures in the range of about 4000 Pascals. These layers were calendered with an engraved roll temperature of 165° C., smooth roll temperature of 167° C. and a pressure between the engraved and smooth roll in the range of 67 N/mm. This calendered web was subsequently hydroengorged in 2 steps with each step comprised of a HE drum and 2 injectors. The calendered fabric was exposed to HE pressure ranges of 140 bars of water pressure per injector station followed by drying the fabric using a through air dryer at about 125° C.

Example 3

The nonwoven fabric of Example 3 was produced by calendering 4 layers of spunbond and then hydroengorging the laminate followed by drying and winding. Each spunbond layer was made up of approximately 82% CP 360H Braskem polypropylene resin, 5% 3962 Meltblown PP resin from Total Petrochemicals, 10% Vistamaxx 7020-BF from Exxon-Mobil and 5% polypropylene masterbatch resin from Standridge Color Corporation containing 10% $TiO_2$ and 10% Erucamide slip aid by weight respectively. During spinning of each spunbond layer, the filaments were spun at a throughput of about 112 kg/hr/m and exposed to cabin pressures in the range of about 4000 Pascals. These layers were calendered with an engraved roll temperature of 165° C., smooth roll temperature of 167° C. and a pressure between the engraved and smooth roll in the range of 67 N/mm. This calendered web was subsequently hydroengorged in 2 steps with each step comprising of a HE drum and 2 injectors. The calendered fabric was exposed to HE pressure ranges of 140 bars of water pressure per injector station followed by drying the fabric using a through air dryer at about 125° C.

Example 4

The nonwoven fabric of Example 4 was produced by calendering 4 layers of spunbond and then hydroengorging the laminate followed by drying and winding. Each spunbond layer was made up of approximately 85% ExxonMobil 3155E5 polypropylene resin, 10% Vistamaxx 7020-BF from ExxonMobil and 5% polypropylene masterbatch resin from Standridge Color Corporation containing 10% $TiO_2$ and 10% Erucamide slip aid by weight respectively. During the spinning of the spunbond layers, the filaments were spun at a throughput of about 160 kg/hr/m and exposed to cabin pressures in the range of 3500 Pascals. These layers were then calendered with an engraved roll temperature of 177° C., smooth roll temperature of 166° C. and a pressure between the engraved and smooth roll in the range of 89 N/mm. This calendered web was subsequently hydroengorged in 2 steps with each step comprised of a HE drum and 2 injectors. The calendered fabric was exposed to HE pressure ranges of 50 bars of water pressure per injector station followed by drying the fabric using a through air dryer at about 90° C.

Example 5

The nonwoven fabric of Example 5 was produced by calendering 4 layers of spunbond and then hydroengorging the laminate followed by drying and winding. Each spunbond layer was made up of approximately 85% ExxonMobil 3155E5 polypropylene resin, 10% Vistamaxx 7020-BF from ExxonMobil and 5% polypropylene masterbatch resin from Standridge Color Corporation containing 10% TiO2 and 10% Erucamide slip aid by weight respectively. During spinning of the spunbond layers, two base (high denier) layers were spun at a throughput of about 160 kg/hr/m and exposed to cabin pressures in the range of 3500 Pascals and two top (low denier) layers were spun at a throughput of about 135 kg/hr/m and exposed to cabin pressures in the range of 3500 Pascals. These layers were then calendered with an engraved roll temperature of 177° C., smooth roll temperature of 166° C. and a pressure between the engraved and smooth roll in the range of 89 N/mm. This calendered web was subsequently hydroengorged in 2 steps with each step comprised of a HE drum and 2 injectors. The calendered fabric was exposed to HE pressure ranges of 50 bars of water pressure per injector station followed by drying the fabric using a through air dryer at about 90° C.

Example 6

The nonwoven fabric of Example 6 was produced by calendering 4 layers of spunbond and then hydroengorging the laminate followed by drying and winding. Each spunbond layer was made up of approximately 81% CP 360H Braskem polypropylene resin, 15% Vistamaxx 7020-BF from Exxon-Mobil and 1% polypropylene masterbatch resin from Standridge Color Corporation containing 70% by weight $TiO_2$ and 3% polypropylene masterbatch resin from Standridge Color Corporation containing 10% $TiO_2$ and 10% Erucamide slip aid by weight respectively. During spinning of each spunbond layer, the filaments were spun at a throughput of about 112 kg/hr/m and exposed to cabin pressures in the range of about 4000 Pascals. These layers were calendered with an engraved roll temperature of 165° C., smooth roll temperature of 167° C. and a pressure between the engraved and smooth roll in the range of 67 N/mm. This calendered web was subsequently hydroengorged in 2 steps with each step comprised of a HE drum and 2 injectors. The calendered fabric was exposed to HE pressure ranges of 140 bars of water pressure per injector station followed by drying the fabric using a through air dryer at about 125° C.

Example 7

The nonwoven fabric of Example 7 was produced by calendering 4 layers of spunbond and then hydroengorging the laminate followed by drying and winding. Each spunbond layer was made up of approximately 81% CP 360H Braskem polypropylene resin, 15% Vistamaxx 7020-BF from Exxon-Mobil, 1% polypropylene masterbatch resin from Standridge Color Corporation containing 70% by weight $TiO_2$ and 3% polypropylene masterbatch resin from Standridge Color Corporation containing 10% $TiO_2$ and 10% Erucamide slip aid by weight respectively. During the spinning of the spunbond layers, two base (high denier) layers were spun at a throughput of about 168 kg/hr/m and exposed to cabin pressures in the range of 3500 Pascals and two top (low denier) layers were spun at a throughput of about 112 kg/hr/m and exposed to cabin pressures in the range of 3500 Pascals. These layers were then calendered with an engraved roll temperature of 165° C., smooth roll temperature of 167° C. and a pressure between the engraved and smooth roll in the range of 67 N/mm. This calendered web was subsequently hydroengorged in 2 steps with each step comprised of a HE drum and 2 injectors. The calendered fabric was exposed to HE pressure ranges of 140 bars of water pressure per injector station followed by drying the fabric using a through air dryer at about 125° C.

The parameters included in FIG. 3 are the basis weight (BW), AP (air permeability) in $m^3/m^2/min$, thickness, CDT (cross machine direction tensile strength) in N/cm (Newtons per centimeter), MD HOM (machine direction Handle-O-Meter) in grams (g), CD HOM (cross machine direction Handle-O-Meter), Avg HOM (average Handle-O-Meter), Static and Kinetic CoF (coefficient of friction), and "visual abrasion" resistance. Measurements were taken of ten samples for each example and the results were averaged.

The Handle-O-Meter (HOM) stiffness of nonwoven materials was performed in accordance with WSP test method 90.3 with a slight modification. The quality of "hand" is considered to be the combination of resistance due to the surface friction and flexural rigidity of a sheet material. The equipment used for this test method is available from Thwing Albert Instrument Co. In this test method, a 100×100 mm sample was used for the HOM measurement and the final readings obtained were reported "as is" in grams instead of doubling the readings per the WSP test method 90.3. Average HOM was obtained by taking the average of MD and CD HOM values. Typically, the lower the HOM values the higher the softness and flexibility, while higher HOM values means lower softness and flexibility of the nonwoven fabric.

Tensile strength measurement was performed in accordance with WSP methods, more specifically WSP 110.4(05) B, using an Instron test machine. Measurement was done in both MD and CD directions, respectively. CD tensile strength (CDT) (in Newtons per centimeter (N/cm)) and elongation (CDE) (in percentage %) are reported in the results table of FIG. 3.

Other reported properties such as air permeability and thickness measurements were determined in accordance with ASTM or INDA standard test methods.

The "abrasion rating" resistance parameter refers to a NuMartindale Abrasion measure of the abrasion resistance of the surface of a fabric sample and was performed in accordance with ASTM D 4966-98, which is hereby incorporated by reference. The NuMartindale Abrasion test was performed on each sample with a Martindale Abrasion and Pilling Tester by performing 40 to 80 abrasion cycles for each sample. Testing results were reported after all abrasion cycles were completed or destruction of the test sample. Preferably, there should be no visual change to the surface of the material.

For each sample, following NuMartindale Abrasion, an abrasion rating was determined based on a visual rating scale of 1 to 5, with the scale defined as follows:
  5=excellent=very low to zero fibers removed from the structure.
  4=very good=low levels of fibers that may be in the form of pills or small strings.
  3=fair=medium levels of fibers and large strings or multiple strings.
  2=poor=high levels of loose strings that could be removed easily.
  1=very poor=significant structure failure, a hole, large loose strings easily removed.

Figure 4A:
FIGS. 4A, 4B, and 4C are micrographs of nonwoven fabrics that are exemplary embodiments of the present invention.
Figure 4B:
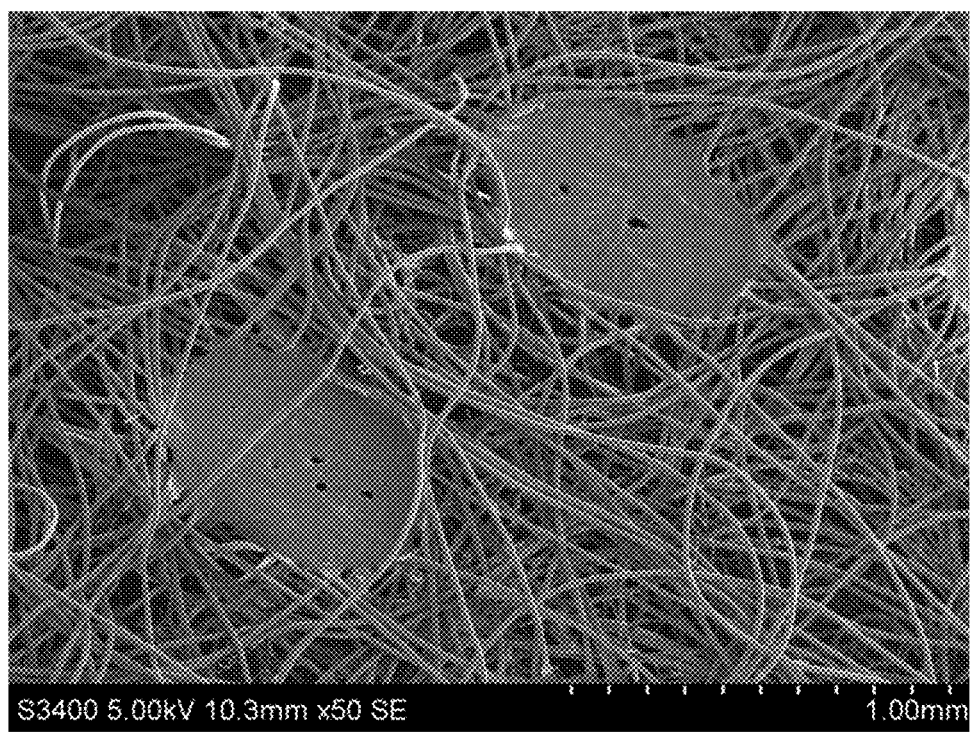
Figure 4C:
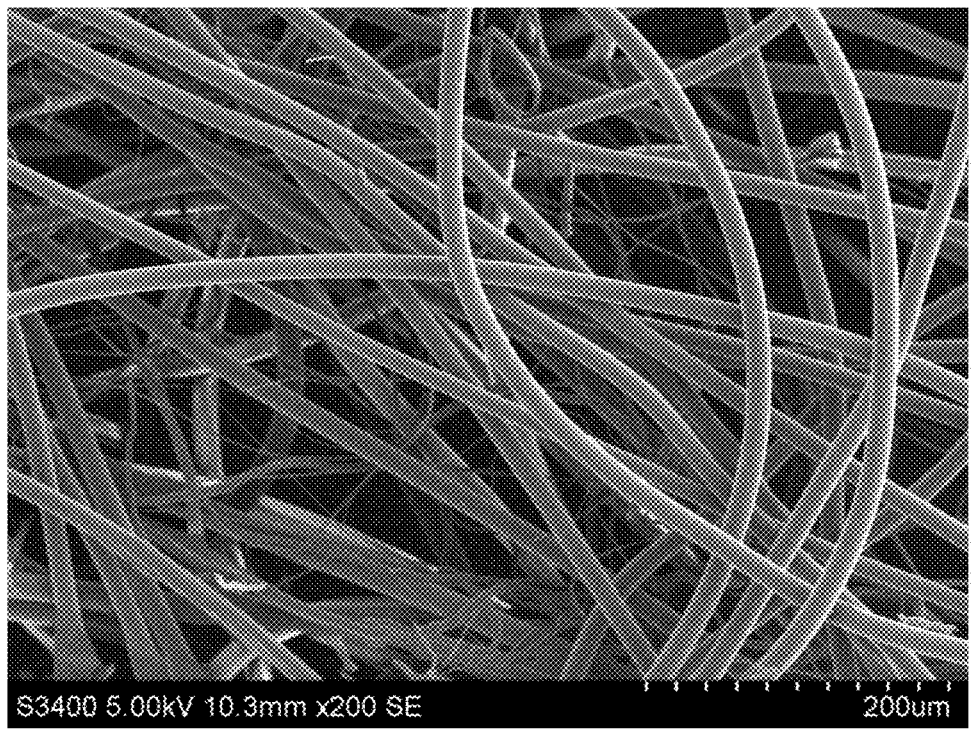
Figure 5A:
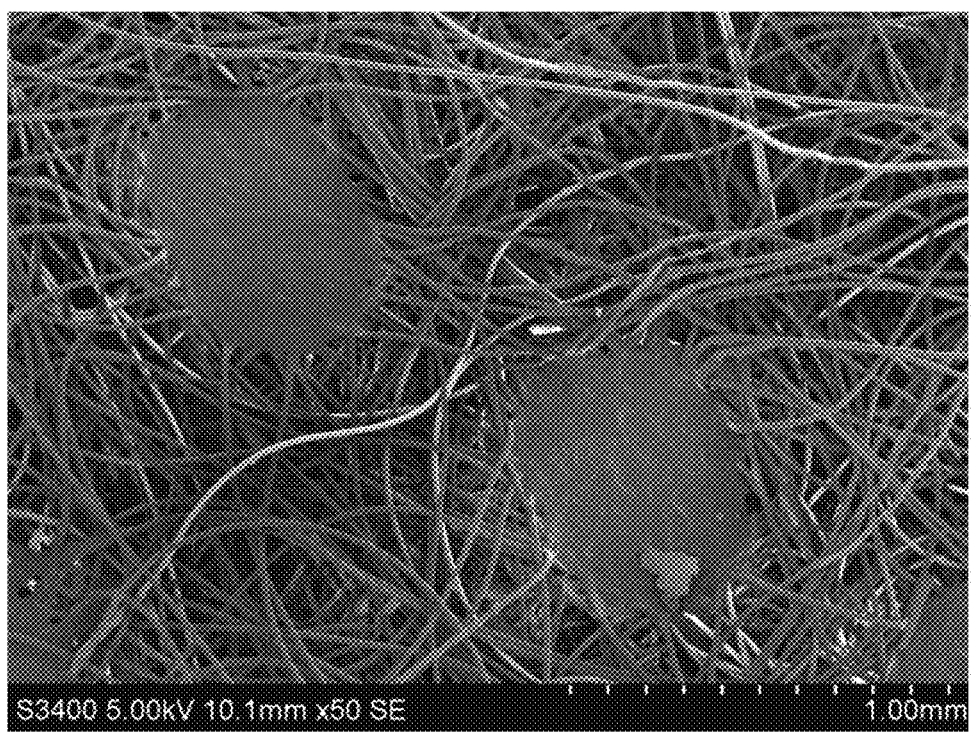
FIGS. 5A, 5B, and 5C are micrographs of a comparative nonwoven fabric.
Figure 5B:
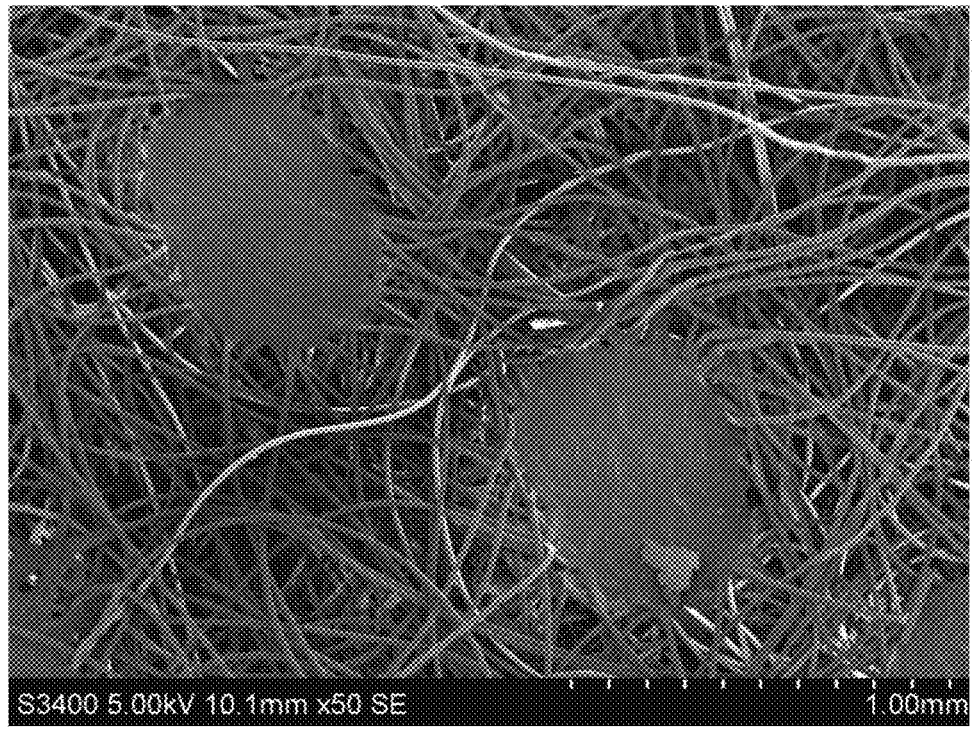
Figure 5C:
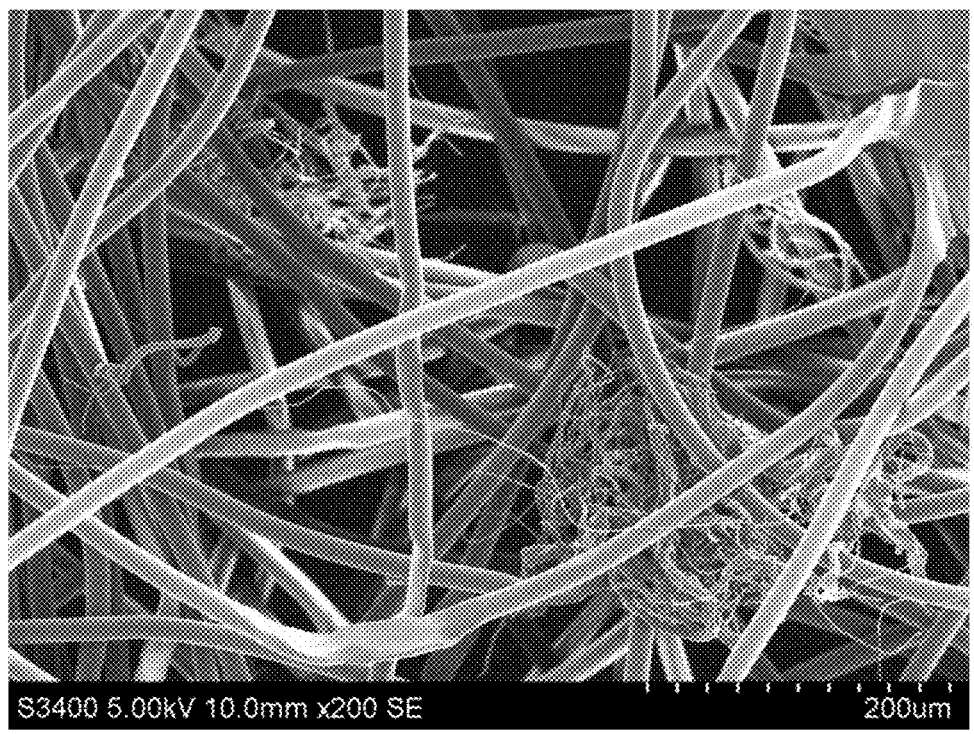

FIGS. 4A-C are micrographs of an exemplary embodiment of the invention, namely a hydroengorged SMS composite fabric where the meltblown fibers are made from a relatively low MFR resin. The meltblown and spunbond fibers both show looping as a result of the hydraulic treatment. There is only limited breakage of the meltblown fibers and the meltblown fibers are distributed relatively uniformly as a result. FIGS. 5A-C are micrographs of a hydroengorged SMS composite fabric made with standard meltblown fibers. Unlike the exemplary embodiment shown in FIGS. 4A-C, the meltblown fibers in the nonwoven of FIGS. 5A-C show significant breakage and subsequent clumping. Without being bound by theory, it is believed that the more uniform distribution and reduced fiber breakage that is obtained by using low MFR meltblown fibers or low denier spunbond fibers instead of standard meltblown fibers provides improved properties to the material including better and more consistent opacity and air permeability, as well as a plusher fabric feel.

While in the foregoing specification a detailed description of specific embodiments of the invention was set forth, it will be understood that many of the details herein given may be varied considerably by those skilled in the art without departing from the spirit and scope of the invention.

The invention claimed is:

1. A nonwoven composite fabric, comprising:
  a first spunbond nonwoven web comprising continuous polymeric fibers, the continuous polymeric fibers of the first nonwoven web having a first denier; and
  a second spunbond nonwoven web comprising continuous polymeric fibers, the continuous polymeric fibers of the second nonwoven web having a second denier that is less than the first denier, wherein:
  the nonwoven composite fabric is hydroengorged, the ratio of the first denier to the second denier is in the range of 1.3:1 to 5:1, and
  the nonwoven composite fabric has an abrasion rating of 3.0 or higher as measured in accordance with ASTM D 4966-98.

2. The nonwoven composite fabric of claim 1, wherein the first nonwoven web comprises continuous polypropylene fibers.

3. The nonwoven composite fabric of claim 1, wherein the first nonwoven web comprises viscose fibers.

4. The nonwoven composite fabric of claim 1, wherein the first nonwoven web comprises one or more layers of continuous polymeric fibers, each of the one or more layers comprising differing types of continuous polymeric fibers.

5. The nonwoven composite fabric of claim 4, wherein at least one of the differing types of continuous polymeric fibers comprises polyethylene.

6. The nonwoven composite fabric of claim 4, wherein at least one of the differing types of continuous polymeric fibers comprises polylactic acid.

7. The nonwoven composite fabric of claim 4, wherein the one or more layers of continuous polymeric fibers of the first nonwoven web comprise bicomponent fibers.

8. The nonwoven composite fabric of claim 1, wherein the first and second nonwoven webs have a total basis weight within a range of 5 grams per square meter (gsm) to 60 gsm.

9. The nonwoven composite fabric of claim 1, further comprising a third nonwoven web comprising continuous polymeric fibers, the continuous polymeric fibers of the third nonwoven web having a third denier, wherein at least a portion of the second nonwoven web is located between the first and third nonwoven webs, and wherein the third denier is greater than the second denier.

10. A method of making the nonwoven composite fabric of claim 1, comprising:
  forming the first spunbond nonwoven web comprising continuous spunbond fibers having a first denier;
  forming the second spunbond nonwoven web comprising continuous spunbond fibers having a second average diameter of at most 75% of first denier;
  calender bonding the first and second spunbond nonwoven webs at a pressure of between 30 newtons per meter (N/m) and 90 N/m to form the composite fabric with a regular bond pattern; and hydraulically treating the composite fabric such that the fibers of the first spunbond nonwoven web and fibers of the second spunbond nonwoven web are intermingled.

11. The method of claim 10, wherein the step of hydraulic treatment comprises hydraulically treating the bonded webs by a plurality of steps of water injection, each over a corresponding screen having a predetermined pattern, the plurality of water injection steps comprising:
a first water injection step of exposing the composite fabric to a plurality of water jets at a first pressure within a range of about 150-250 bars;
a second water injection step of exposing the composite fabric to a plurality of water jets at a second pressure within a range of about 150-250 bars; and
a third water injection step of exposing the composite fabric to a plurality of water jets at a third pressure within a range of about 150-250 bars.

12. The method of claim 10, wherein the step of hydraulic treatment comprises hydraulically treating the bonded webs by a plurality of steps of water injection, each over a corresponding screen having a predetermined pattern, the plurality of water injection steps comprising:
a first water injection step of exposing the composite fabric to a plurality of water jets at a first pressure within a range of about 50-250 bars;
a second water injection step of exposing the composite fabric to a plurality of water jets at a second pressure within a range of about 50-250 bars; and
a third water injection step of exposing the composite fabric to a plurality of water jets at a third pressure within a range of about 50-250 bars.

13. The method of claim 10, wherein the step of forming a second spunbond web further comprises spinning spunbond fibers at a throughput of less than 140 kg/hr/m.

14. A nonwoven composite fabric, comprising:
first and second outer nonwoven layers comprising spunbond fibers; and
a third inner nonwoven layer comprising meltblown fibers, wherein the nonwoven composite fabric is thermally bonded with a regular bond pattern having a percentage bond area of 8% or greater, the nonwoven composite fabric is hydraulically treated, the meltblown fibers comprise a polymer resin having a mean flow rate of less than 1800 g/10 min, and the nonwoven composite fabric has an abrasion rating of 4.0 or higher and an average Handle-O-Meter measurement (HOM) of 6.0 grams (g) or lower, wherein Handle-O-Meter is measured in accordance with a modified WSP test method 90.3 and the average Handle-O-Meter is obtained by taking the average of machine direction and cross direction HOM values.

15. The nonwoven composite fabric of claim 14, wherein the meltblown fibers comprise a polymer resin having a mean flow rate of less than 1200 g/10 min.

* * * * *